No. 608,188. Patented Aug. 2, 1898.
H. J. DOUGHTY.
PNEUMATIC TIRE.
(Application filed Feb. 4, 1897. Renewed Jan. 4, 1898.)
(No Model.)
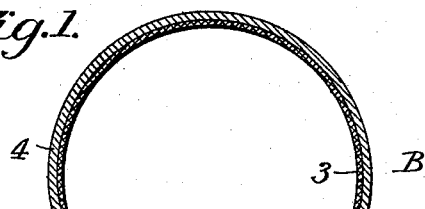
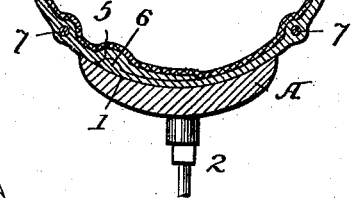
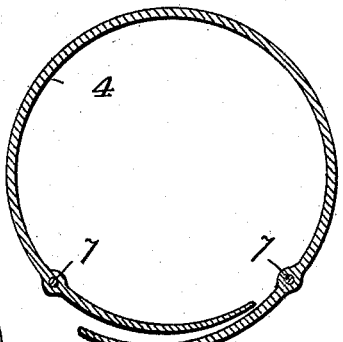
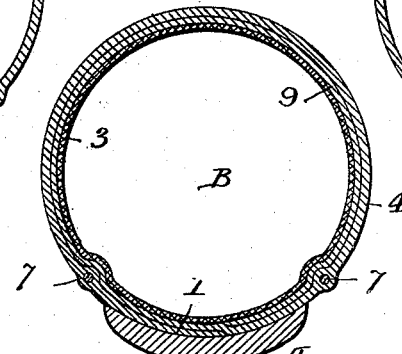
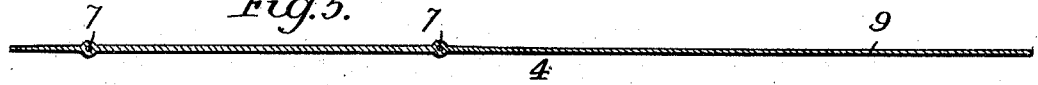
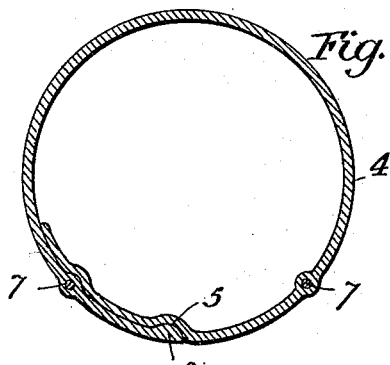
Witnesses
Inventor
Henry J. Doughty
by
Attorneys

UNITED STATES PATENT OFFICE.

HENRY J. DOUGHTY, OF PROVIDENCE, RHODE ISLAND, ASSIGNOR TO THE ATLANTIC RUBBER COMPANY, OF MAINE.

PNEUMATIC TIRE.

SPECIFICATION forming part of Letters Patent No. 608,188, dated August 2, 1898.

Application filed February 4, 1897. Renewed January 4, 1898. Serial No. 665,600. (No model.)

*To all whom it may concern:*

Be it known that I, HENRY J. DOUGHTY, a citizen of the United States, residing at Providence, in the county of Providence and State of Rhode Island, have invented certain new and useful Improvements in Pneumatic Tires, of which the following is a specification.

This invention relates to certain new and useful improvements in pneumatic tires, and has for its object to provide a simple tire of this kind adapted for use in connection with any ordinary wheel-rim and which will permit ready access to the air-tube for repairing it.

With these objects in view the invention consists, in combination with a wheel-rim, of an inflatable air-tube and a covering or protector strip inclosing the air-tube provided with parallel non-stretchable securing rings or loops and upon the inside of which are flexible strips; and, further, the invention consists in the novel features of construction and arrangement hereinafter more fully described.

In the accompanying drawings, forming a part of this specification, and in which like letters of reference indicate corresponding parts, Figure 1 is a cross-sectional view of the invention with the tire applied to a wheel-rim. Fig. 2 is a similar view with the parts separated and the air-tube deflated. Figs. 3 to 6 are views of modifications.

Referring to the drawings, A designates the wheel-rim, of any ordinary construction, provided with the usual grooved or concave face 1. The spokes 2 are secured to the wheel-rim in any desired way.

B is the tire, comprising an inner inflatable tube 3 and an outer covering 4, adapted to inclose the inner tube and serve as the tread of the wheel.

The inner tube 3 may be formed in any desired way; but preferably it is of the ordinary endless form, constructed of elastic material and provided with the usual inflating-tube.

The outer covering 4 may be formed of any suitable flexible waterproof material and is preferably non-elastic, or it may be formed of a combination of materials, such as rubber and canvas, in which case the canvas strip would be secured to one or both faces of the rubber strip or be embedded in it, and the canvas may completely cover the inner or outer face of the covering or only partially cover it, as found desirable. This outer covering is preferably of a width sufficient to extend completely around the inner tube when it is inflated to its fullest capacity, with its edges overlapping at a point intermediate the inner tube and wheel-rim. It is preferred also to provide the overlapping edges or flexible strips of the covering with engaging portions which will maintain them in proper relative position. Thus, as shown in Figs. 1 and 2, one edge or strip of the covering 4 is provided with a recess 5, which receives a bead or enlargement 6, formed at its opposite edge or strip.

Secured to the covering 4 at a distance from and parallel to each edge is a securing hoop or band 7 of non-elastic material, such as cord or wire, and these rings are arranged at such distance from the edges of the cover 4 as to lie wholly without the wheel-rim A and in a plane intermediate said rim and the axis of the tire when the parts are assembled.

Heretofore it has been customary to secure a covering around an air-tube by means of a non-stretchable hoop or band located or attached to the edge of the covering; but when thus arranged it is necessary that the edge of the covering be overlapped and lie on the outer surface or tread of the tire; but this construction is very objectionable for the reason that sand, dust, and moisture works under the exposed edges of the covering and tends to destroy and lessen the efficiency of the tire. By locating the securing hoops or rings at a distance from the edges of the covering said hoops may be disposed wholly without the wheel-rim, while the inner flexible strips or edges of the tire-cover are overlapped at a point intermediate the air-tube and wheel-rim and are unexposed and protected.

The construction shown in Fig. 3 of the drawings is identical with that above described except that the overlapped edges of the tire-cover are not provided with engaging portions depending wholly upon frictional contact to keep them in proper position.

In the modified form of the invention illustrated in Figs. 4 and 5 the tire-cover 4 is formed sufficiently wide to permit it to be wrapped spirally twice around the inner tube, one of the non-stretchable hoops 7 being secured to the tire-cover at a point substantially one-third of its width and the other at a distance from and parallel to the edge nearest the first-mentioned hoop, and preferably the extended portion 9 of the tire-cover, or that which in practice lies in contact with the inner tube, is of less thickness than the extreme outer portion. From this it will be obvious that the covering is wrapped or coiled spirally about the inner tube, and its extreme edges or inner flexible portion are disposed within the concave portion of the wheel-rim intermediate the rim and inner tube. The extreme opposite edges of the tire-cover do not rest in contact, however, but are separated by an intervening portion or coil of said strip. As thus arranged there is absolutely no liability of dirt or moisture working under the edges of the outer covering, as would be the case if the edge of the covering were exposed. In this form of tire the engaging portions at the edges of the tire-covering 4 are unnecessary, as the frictional contact between the coils of the tire-cover and between the said cover and the air-tube will be sufficient to prevent shifting of the said edges.

As shown in Fig. 6, the edges or flexible strips of the covering 4 are overlapped for a greater distance than they are in Fig. 1, and one of these edges is provided with a bead or enlargement to which the other edge is made to conform by the pressure exerted upon it by the inflated air-tube. In other particulars this construction does not differ from those previously described.

It will be obvious that while I have described the inner flexible portions of the tire-cover as being overlapped within the wheel-rim this need not necessarily be the case, as the said portions may be disposed within the rim in any other desired manner—as, for instance, by merely bringing their edges together without overlapping them.

Without limiting myself to the precise construction and arrangement of the parts shown and described, since it will be evident that various changes may be made without departing from the spirit of my invention, what I claim is—

A flexible pneumatic-tire cover, having parallel non-extensible hoops and inside of each hoop a flexible strip, the strips being adapted to be disposed within the wheel-rim, and the non-extensible hoops disposed wholly without said rim, substantially as described.

In testimony whereof I have signed my name to this specification in the presence of two subscribing witnesses.

HENRY J. DOUGHTY.

Witnesses:
ROBERT L. WALKER,
AMASA SPRAGUE, 2nd.